Sept. 14, 1965
T. A. OLDFIELD
3,205,909
PRESSURE CONTROLLER
Filed Jan. 18, 1963
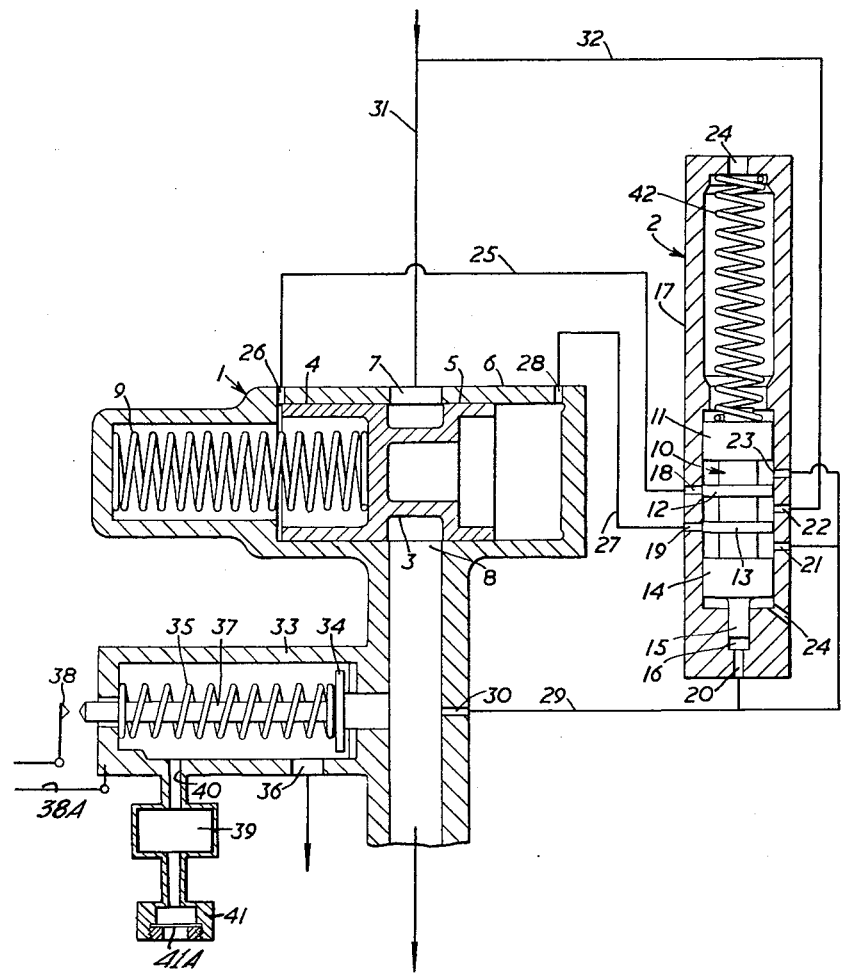

3,205,909
PRESSURE CONTROLLER
Thomas Alfred Oldfield, Allestree, Derby, England, assignor to The Plessey Company Limited, Ilford, England, a British company
Filed Jan. 18, 1963, Ser. No. 280,175
3 Claims. (Cl. 137—540)

This invention relates to a fluid pressure relief valve for use at the outlet of a reducing valve device of the kind intended to maintain the outlet pressure constant, wherein additional means are provided which suppress pressure surges originating at the downstream side of the reducing valve and which are so constructed as to be capable of preventing an undue rise of the downstream pressure even if the pressure reducing valve proper is permanently stuck in the fully open position. It has for an object to provide an indication or warning when the last-mentioned condition has arisen but not upon the response of the device to suppress pressure surges of short duration. Various features of the invention and further objects will become apparent as this specification proceeds with reference to the accompanying drawing which is a diagrammatic sectional elevation of a valve device incorporating one form of the present invention.

Referring now to the drawing, the pressure-reducing valve proper is indicated at 1. Its housing 6 has a cylindrical bore in which a piston 3 having two lands 4 and 5 can slide from a normal position, to which it is urged by a spring 9, and in which the land 4 cuts off connection between an upstream port or chamber 7 intended for connection to a fluid-pressure supply line 31, and a downstream port and passage 8 leading to the controlled pressure system. Ports 26 and 28 at the two ends of the cylinder are respectively connected by lines 25 and 27 to service ports 18 and 19 of the housing 17 of a pilot valve 2. This housing 17 has a cylindrical bore in which a spool type valve element 10 having four lands 11, 12, 13 and 14, is slidable to selectively control the connection of the service ports 18 and 19 with an inlet port 22, fed from the fluid supply line by a branch line 32, and two outlet ports 21 and 23, which are arranged respectively at opposite sides of the inlet port 22 in the direction of movement of the valve element 10, and which are connected by a line 29 to a tapping 30 of the downstream passage 8 of the reducing valve proper 1. The position of the slide-valve element 10 is controlled by a reduced-diameter extension 15; this extension forms a ram piston in a cylinder 16, which, via a bore 20 connected to the line 29, communicates with a tapping 30 of the downstream passage 8 of the valve 1, a helical spring 42 being arranged in a vented chamber at the opposite end of the pilot-valve housing to oppose the action of the downstream pressure upon the piston 15. The end of the pilot-valve housing facing the remaining annular portion of the land 14 is, like the opposite end of the valve housing 17, vented by an atmospheric aperture 24.

Describing now the operation of the apparatus as so far described, and assuming first that no pressure is available in the supply line 31, it will be appreciated that the spring 9 will hold the valve element 3 of the reducing valve 1 in the position in which the land 4 cuts off communication between ports 7 and 8, thus preventing the risk of sudden and excessive pressure rise in the outlet port 8 in the case of sudden connection of line 31 to a supply at high pressure. Normally in these conditions the pressure in downstream passage 8 does not exceed atmospheric pressure, and the spring 42 will therefore hold the valve element 10 at that end of its bore in which inlet port 22 communicates with service port 19 while service port 18 communicates with outlet port 23. As soon as pressure is applied to line 31, fluid under pressure will reach the right-hand end of the bore in housing 6 and will begin to move piston 3 against the action of the spring 9 towards the illustrated fully open position. Pressure will now gradually build up in the outlet passage 8, and when this pressure reaches the value for which the pilot valve 2 has been set, the action of the downstream pressure in outlet passage 8 upon piston extension ram 15 will overcome the action of spring 42 and move the spool valve element 10 to the illustrated position, in which both service ports 18 and 19 are blanked by the lands 12 and 13, thereby preventing further movement of the servo-operated reducing valve element 3. If for any reason, for example due to a reduction in consumption of pressurised fluid, the pressure in outlet passage 8 tends to rise above the preset value, the increased pressure in the outlet will act upon ram piston 15 to compress the spring 42 further, and move the spool valve 10 above the illustrated position, thus establishing connection from the inlet 22 via outlet 18 to the left-hand end of the cylinder in housing 6 and connecting the other service port 19 to the outlet 21 and thus to the downstream side of the reducing valve 1. As a result the servo piston 3 will move to the right of the drawing, thereby reducing the cross-section available for the passage from inlet port 7 to outlet port and passage 8, and in consequence thereby counteracting the increase of pressure in the outlet passage 8.

Conditions in the consumer system may tend to produce pressure surges in the outlet line 8, and in order to suppress these, the outlet duct is, according to the invention, equipped with a plate-type relief valve 34 loaded by a spring 35. When open this relief valve permits escape from the duct 8 into a chamber 33 which has an atmospheric outlet 36. The relief valve 34 is equipped with an electrical contact device comprising a pin 37 movable with the valve element 34 which, when the valve element 34 opens to a predetermined extent, strikes a stationary contact 38, thereby closing an electric signal circuit 38, 38a. A further indicating device is provided to give a further warning in the case of the relief valve being substantially open for an appreciable period. For this purpose the outlet 36 is so dimensioned that when the valve 34 is fully open (as would be the case if the reducing valve 3 should get stuck in the fully open position, so that the relief valve 34 would be alone relied upon to prevent an undue pressure rise in the outlet duct 8) the pressure in chamber 33 will rise appreciably above normal atmospheric pressure. A chamber 41 containing a bursting disc 41a is connected with the interior of the chamber 33 through a restricted aperture or snubber 40, and the chamber 41 communicates with a reservoir 39, which acts as a time-delay device. When pressure in chamber 33 rises due to the relief valve 34 opening to an extent occurring under failure of the reducing valve 3, pressure in chamber 33 rises, thus causing fluid to pass at a rate controlled by this pressure through the restricted aperture or snubber 40 into the reservoir 39, producing a gradual build-up of pressure in that reservoir. If the conditions mentioned disappear after a short time, the pressure in chamber 33 will drop again and allow the pressure in reservoir 39 to blow off through snubber aperture 40 without ever becoming high enough to burst the bursting disc 41a. If however the condition perseveres for an appreciable time, the pressure in chamber 39 will build up to a value similar to that in chamber 33 and will thus cause the disc 41a to burst, thereby giving permanent indication of the defect of the valve at the next ground inspection of the aircraft. On the other hand the provision of this indicating device will not interfere in any way with the protective action of the relief valve, since the area of the restricted snubber aperture 40 is small compared with the permanently open aperture 36.

The valve device described is highly suitable for use in the air supply line of pneumatic actuator systems in aircraft which derive their operating air from the turbo-compressor of a turbo-jet engine, more particularly in a thrust-reverser control system for jet aircraft operated in such manner. Such control system must be continuously ready for operation, and therefore be continuously pressurized as long as the engine is running, and it is required to operate satisfactorily even when the engine runs only at idling speed and when therefore the bleed-air pressure of its compressor is low. The provision of an actuator which will develop sufficient power at this low pressure but would nevertheless reliably stand up to the bleed-air pressure occurring at maximum engine speeds would be undesirably expensive, and the actuator system would be heavy, a disadvantage which can be avoided by the interposition of a pressure-reducing valve maintaining a constant downstream pressure approximately equal to the bleed-air pressure available at idling speed. Since the actuator in question is only operated for short periods, the pressure-reducing valve will for most of the time operate in the so-called cracked condition, in which it supplies only the small amount of air needed to compensate for leakage in the actuator system. On the other hand during operation of the actuator at low engine speeds the reducing valve will have to open fully in order to maintain the desired pressure. The provision of a relief valve safe-guards the actuator system if for any reason the reducing valve should get stuck in this fully open position, in which case the relief valve prevents the actuator from becoming subject at higher engine speeds to pressures which it is not constructed to withstand. Furthermore similar high pressures might, in the absence of the relief valve, occur momentarily when at the end of the actuator stroke the consumption of air ceases more suddenly than the servo-operated reducing valve will close to the cracked condition required for mere compensation of leakages. It will be appreciated that in both cases the relief valve will have to open wide in order to allow the escape of the unwanted air supplied to the reducing valve, but while in the last-mentioned case it will stay open only for the short period required for the reducing valve to return to its normal position, the relief valve will in the case of failure of the reducing valve in the open position, stay wide open at least until the actuator is operated again. While the electrical contact device 38 will produce a signal in both cases, the provision of the time-delay reservoir 39 ensures that in the first case the pressure in reservoir 39, i.e. the pressure which acts on the bursting disc 41a, will not reach a value sufficient to burst this disc, while in the latter case there is sufficient time for the pressure in reservoir 39 to build up to the value at which the disc 41a will burst, so that the burst disc 41 will indicate the faulty condition of the reducing valve.

What I claim is:

1. A fluid-pressure relief valve for use at the outlet of a pressure-reducing valve, said relief valve comprising a housing formed with a valve seat connecting an inlet chamber with an outlet chamber, said outlet chamber having a restricted atmospheric outlet, and with a time-delay reservoir communicating with said outlet chamber through an orifice which is small in comparison with said atmospheric outlet, a valve element co-operating with said valve seat, spring means urging said valve element on to said seat against the action of the pressure in said inlet chamber, and indicator means rendered operative by the pressure in said reservoir when the pressure in the reservoir exceeds atmospheric pressure by a predetermined amount.

2. A pressure reducing valve as claimed in claim 1, wherein said indicating means include a bursting disc.

3. A pressure reducing valve as claimed in claim 3, further including indicating means directly controlled by the relief valve to respond when the opening of the relief valve reaches a predetermined value.

References Cited by the Examiner

UNITED STATES PATENTS

| | | | |
|---|---|---|---|
| 737,681 | 9/03 | Waring | 137—488 |
| 1,305,964 | 6/19 | Dickson | 137—557 X |
| 1,348,708 | 8/20 | Garland | 137—797 X |
| 1,571,022 | 1/26 | Obert | 137—71 |
| 2,115,512 | 4/28 | Vincent | 137—505.11 X |
| 2,146,479 | 2/39 | Horstmann | 137—554 |
| 2,190,725 | 2/40 | McBride | 137—71 |

FOREIGN PATENTS 277,138    8/51    Switzerland.

MARTIN P. SCHWADRON, *Acting Primary Examiner.*

M. CARY NELSON, *Examiner.*